US008056331B2

(12) United States Patent
Kakizawa et al.

(10) Patent No.: US 8,056,331 B2
(45) **Date of Patent: *Nov. 15, 2011**

(54) PUMP TORQUE CONTROLLER OF HYDRAULIC WORKING MACHINE

(75) Inventors: Kenji Kakizawa, Tsuchiura (JP); Gen Yasuda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 843 days.

This patent is subject to a terminal disclaimer.

(21) Appl. No.: 12/092,500

(22) PCT Filed: Nov. 21, 2006

(86) PCT No.: PCT/JP2006/323208

§ 371 (c)(1),
(2), (4) Date: May 2, 2008

(87) PCT Pub. No.: WO2007/060948

PCT Pub. Date: May 31, 2007

(65) Prior Publication Data

US 2009/0126361 A1 May 21, 2009

(30) Foreign Application Priority Data

Nov. 25, 2005 (JP) ................................ 2005-340459

(51) Int. Cl.
*F16D 31/02* (2006.01)

(52) U.S. Cl. ........................................... 60/431; 60/452

(58) Field of Classification Search .................... 60/431, 60/433, 444, 449, 452, 456
See application file for complete search history.

(56) References Cited

U.S. PATENT DOCUMENTS

| | | | | |
|---|---|---|---|---|
| 4,967,557 A * | 11/1990 | Izumi et al. | | 60/452 |
| 5,267,441 A | 12/1993 | Devier et al. | | |
| 6,672,055 B1 | 1/2004 | Konishi et al. | | |
| 2005/0160727 A1* | 7/2005 | Nakamura et al. | | 60/431 |

FOREIGN PATENT DOCUMENTS

| | | |
|---|---|---|
| GB | 2 318 886 A | 5/1998 |
| JP | 5-248401 A | 9/1993 |
| JP | 9-126150 A | 5/1997 |
| JP | 9-195947 A | 7/1997 |
| JP | 10-141110 A | 5/1998 |
| JP | 2001-140806 A | 5/2001 |
| JP | 2004-132195 A | 4/2004 |
| JP | 2004-132197 A | 4/2004 |
| JP | 2005-188433 A | 7/2005 |
| JP | 2005-188674 A | 7/2005 |
| JP | 2005-233120 A | 9/2005 |
| JP | 2006-112288 A | 4/2006 |
| WO | WO 2004/018877 A1 | 3/2004 |

OTHER PUBLICATIONS

International Search Report dated Jan. 9, 2007 with English translation (Four (4) pages).

* cited by examiner

*Primary Examiner* — Michael Leslie
(74) *Attorney, Agent, or Firm* — Crowell & Moring LLP

(57) ABSTRACT

To permit a precise and easy adjustment of a pump absorption torque of a main pump in accordance with environmental conditions when a sub-pump different in characteristics from the main pump is connected to a prime mover. A main controller 12 includes a processor means for setting the level of an absorption torque of a cooling fan pump 20 at a maximum absorption torque in use, a processor means for incrementing an adjustment target absorption torque for a main pump 13 at a slow rate from a sufficiently small pump absorption torque, and a processor means for repeating loading of a load factor signal and the increment of the adjustment target absorption torque as long as "NO" is determined by a fourth determination means, and a processor means for storing the adjustment target absorption torque as an adjustment value when "YES" has been determined by the fourth determination means.

9 Claims, 7 Drawing Sheets

PUMP TORQUE CONTROLLER OF HYDRAULIC WORKING MACHINE

TECHNICAL FIELD

This invention relates to a pump torque control system for a hydraulic working machine, such as a hydraulic excavator, having a variable displacement main pump and variable displacement sub-pump both of which are driven by a prime mover, which is arranged on the hydraulic working machine to control an absorption torque for the main pump.

BACKGROUND ART

Depending on environmental conditions such that a hydraulic working machine is installed in an upland area or performs work in an environment of extremely low temperatures or use conditions of a hydraulic working machine such that work is performed using inferior fuel or different work loads are applied to the hydraulic working machine, a prime mover, that is, an engine may be overloaded even if the hydraulic machine is the same. In such a case, a need arises to limit the engine output. It is, hence, necessary for a maintenance service engineer to visit the site and to adjust the maximum absorption torque of the main pump of the hydraulic working machine. This adjustment of the maximum absorption torque of the main pump requires special equipment such as service tools, and moreover, the maintenance service engineer is required to have good skills and experiences.

In addition to a main pump, sub-pumps different in the manner of control and the manner of use from the main pump, such as a cooling fan pump and a pilot pump, are also connected to an engine. In other words, plural pumps different in characteristics from each other are connected to an engine. Unless the above-mentioned adjustment is performed well, an interference takes place in pump absorption torque among the pumps to adversely affect the operability and working performance of the hydraulic working machine.

Conventional technologies of the above-mentioned sort include those disclosed in Patent Documents 1 and 2. The conventional technology disclosed in Patent Document 1 is to change the setting of the engine revolution speed depending on the altitude. The conventional technology disclosed in Patent Document 2, on the other hand, is to use a sealed bellows vessel, which can expand or contract depending on the atmospheric pressure to make the absorption torque of a pump variable in accordance with the atmospheric pressure.

Patent Document 1: JP-A-2004-132197

Patent Document 2: JP-A-9-126150

DISCLOSURE OF THE INVENTION

Means for Solving the Problems

The above-described conventional technology disclosed in Patent Document 1, however, requires to adjust the maximum absorption torque of a main pump depending on the temperature, atmospheric pressure, fuel type, workload and the like even if the altitude conditions are the same. A maintenance service engineer is, therefore, required to visit the site to perform an adjustment as mentioned above, so that the irksomeness still remains unchanged. With the conventional technology disclosed in Patent Document 2, an irksome adjustment of the maximum absorption torque of a main pump by a maintenance service engineer is also needed depending on the temperature, work load, fuel type and the like even if the atmospheric pressure is the same.

With the above-mentioned situations of the conventional technologies in view, the present invention has as an object thereof the provision of a pump torque control system for a hydraulic working system, which makes it possible to precisely and easily adjust the maximum absorption torque of a main pump in accordance with the environmental conditions and use conditions when one or more sub-pumps different in characteristics from the main pump are connected to a prime mover.

Means for Solving the Problem

To achieve the above-described object, the present invention is characterized in that in a pump torque control system for a hydraulic working machine having:

a prime mover, a revolution speed setting means for setting a revolution speed of the prime mover, a prime mover controller comprising an input means for loading the preset revolution speed signal set by the revolution speed setting means, a control means for controlling the revolution speed of the prime mover based on the preset revolution speed signal, an output means for outputting to an outside a signal corresponding an actual revolution speed of the prime mover, and an output means for outputting to the outside a load factor signal corresponding to an output torque of the prime mover, an actuator for driving a movable element, a variable displacement main pump drivable by the prime mover to feed pressure oil to the actuator, a directional control valve for controlling a flow rate and direction of pressure oil to be fed from the main pump to the actuator, a main pump regulator for controlling a displacement volume of the main pump, a variable displacement sub-pump drivable by the prime mover, and a sub-pump regulator for controlling a displacement volume of the sub-pump, the pump torque control system is provided with:

a solenoid-operated proportional valve for the main pump to drive the main pump regulator, and a solenoid-operated proportional valve for the sub-pump to drive the sub-pump regulator, a stroke detector for detecting a stroke of the directional control valve, and a delivery pressure detector for detecting a delivery pressure of the main pump, a main controller comprising an input means for loading the preset revolution speed signal set by the revolution speed setting means, an input means for loading a stroke signal outputted from the stroke detector, an input means for loading a delivery pressure signal outputted from the delivery pressure detector, a positive control means for computing a target displacement volume based on the stroke signal outputted from the stroke detector, a torque limiter means for computing a target absorption torque for the main pump from the preset revolution speed signal outputted from the revolution speed setting means and for computing a target displacement volume for the main pump from the computed target absorption torque and the delivery pressure signal outputted from the delivery pressure detector, a selector means for comparing the target displacement volume computed by the positive control means with the target displacement volume computed by the torque limiter means and for selecting the smaller one as a target displacement volume, an output means for outputting a control signal to the solenoid-operated proportional valve for the main pump based on the target displacement volume selected by the selector means, a computer means for computing a target displacement volume for the sub-pump, and an output means for outputting a control signal to the solenoid-operated proportional valve for the sub-pump based on the target displacement volume for the sub-pump computed by the computer means, and a start means for instructing a start of an adjustment of a maximum absorption torque for the main pump; and the main controller comprises:

a first determination means for determining if the setting of the preset revolution speed, which was set by the revolution speed setting means, has been fixed at a rated revolution speed by the instruction from the start means and for outputting a result of the determination, a second determination means for determining, by the instruction from the start means, if the delivery pressure detected by the delivery pressure detector is higher than a predetermined value set beforehand and for outputting a result of the determination, a third determination means for determining, by the instruction from the start means, if the stroke detected by the stroke detector is greater than a predetermined value set beforehand and for outputting a result of the determination, a processor means for switching, when all the determinations by the first, second and third means have resulted in "YES", the target displacement volume for the sub-pump such that a level of an absorption torque of the sub-pump is set to correspond to a maximum load in use, an input means for loading the load factor signal associated with the prime mover and outputted from the prime mover controller, a processor means for incrementing a target absorption torque for the adjustment at a slow rate from a sufficiently small pump absorption torque, a fourth determination means for determining if a difference between a load factor of the prime mover and the target load factor falls within a predetermined range and for outputting a result of the determination, a processor means for repeatedly performing the loading of the load factor signal and the increment of the target absorption torque for the adjustment as long as the determination by the fourth determination means results in "NO", a processor means for acquiring, when the determination by the fourth determination means has resulted in "YES", a target absorption torque at that time and for performing processing that the acquired target absorption torque or a difference between the acquired target absorption torque and a predetermined reference torque is stored as an adjustment value, and a processor means for limiting the target absorption torque, which has been computed by the torque limiter means, by the adjustment value.

In the present invention constructed as described above, when the start of an adjustment of the maximum absorption torque for the main pump is instructed by the start means, processing is performed to slowly increment, with the load on the sub-pump being set at the maximum load, in other words, being set corresponding to the maximum absorption toque, the absorption torque for the main pump from a minimum side thereof until the load factor of the prime mover becomes the target value, i.e., the target load factor. By slowly incrementing as described above, the adjustment is feasible at a stationary point. When the load factor of the prime mover comes into conformity with the target load factor, an absorption toque is acquired for the main pump. The value so acquired serves as an adjustment value. The absorption torque control of the main pump is performed with the maximum absorption torque for the main pump being limited such that the maximum absorption torque remains not greater than the adjustment value. As a consequence, the load factor of the prime mover is limited such that it does not exceed the target load factor. Described specifically, when a sub-pump different in characteristics from a main pump is connected to a prime mover, the maximum absorption torque for the main pump can be precisely and easily adjusted in accordance with the environmental conditions and use conditions. Because the current maximum absorption torque for the main pump can be precisely adjusted with the absorption torque for the sub-pump being set corresponding to the maximum load, in other words, at the maximum absorption torque, it is possible to prevent an interference in pump absorption torque between the main pump and the sub-pump.

To achieve the above-mentioned object, the present invention is also characterized in that in a pump torque control system for a hydraulic working machine having:

a prime mover, a revolution speed setting means for setting a revolution speed of the prime mover, a prime mover controller comprising an input means for loading the preset revolution speed signal set by the revolution speed setting means, a control means for controlling the revolution speed of the prime mover based on the preset revolution speed signal, an output means for outputting to an outside a signal corresponding an actual revolution speed of the prime mover, and an output means for outputting to the outside a load factor signal corresponding to an output torque of the prime mover, an actuator for driving a movable element, a variable displacement main pump drivable by the prime mover to feed pressure oil to the actuator, a directional control valve for controlling a flow rate and direction of pressure oil to be fed from the main pump to the actuator, a main pump regulator for controlling a displacement volume of the main pump, a variable displacement sub-pump drivable by the prime mover, and a sub-pump regulator for controlling a displacement volume of the sub-pump, the pump torque control system is provided with:

a solenoid-operated proportional valve for the main pump to drive the main pump regulator, and a solenoid-operated proportional valve for the sub-pump to drive the sub-pump regulator, a stroke detector for detecting a stroke of the directional control valve, and a delivery pressure detector for detecting a delivery pressure of the main pump, a main controller comprising an input means for loading the preset revolution speed signal set by the revolution speed setting means, an input means for loading a stroke signal outputted from the stroke detector, an input means for loading a delivery pressure signal outputted from the delivery pressure detector, a positive control means for computing a target displacement volume based on the stroke signal outputted from the stroke detector, a torque limiter means for computing a target absorption torque for the main pump from the preset revolution speed signal outputted from the revolution speed setting means and for computing a target displacement volume for the main pump from the computed target absorption torque and the delivery pressure signal outputted from the delivery pressure detector, a selector means for comparing the target displacement volume computed by the positive control means with the target displacement volume computed by the torque limiter means and for selecting the smaller one as a target displacement volume, an output means for outputting a control signal to the solenoid-operated proportional valve for the main pump based on the target displacement volume selected by the selector means, a computer means for computing a target displacement volume for the sub-pump, and an output means for outputting a control signal to the solenoid-operated proportional valve for the sub-pump based on the target displacement volume for the sub-pump computed by the computer means, and a start means for instructing a start of an adjustment of a maximum absorption torque for the main pump; and the main controller comprises:

a first determination means for determining if the setting of the preset revolution speed, which was set by the revolution speed setting means, has been fixed at a rated revolution speed by the instruction from the start means and for outputting a result of the determination, a second determination means for determining, by the instruction from the start means, if the delivery pressure detected by the delivery pressure detector is higher than a predetermined value set beforehand and for outputting a result of the determination, a third determination means for determining, by the instruction from the start means, if the stroke detected by the stroke detector is greater than a predetermined value set beforehand and for outputting a result of the determination, a processor means for switching, when all the determinations by the first, second and third means have resulted in "YES", the target displacement volume for the sub-pump such that a level of an absorption torque of the sub-pump is set to correspond to a maximum load in use, an input means for loading the load factor signal associated with the prime mover and outputted from the prime mover controller, a processor means for decrementing, to an extent that the prime mover does not stall, a target absorption torque for the adjustment at a slow rate from a sufficiently large pump absorption torque set beforehand, a fourth determination means for determining if a difference between a load factor of the prime mover and the target load factor falls within a predetermined range and for outputting a result of the determination, a processor means for repeatedly performing the loading of the load factor signal and the decrement of the target absorption torque for the adjustment as long as the determination by the fourth determination means results in "NO", a processor means for acquiring, when the determination by the fourth determination means has resulted in "YES", a target absorption torque at that time and for performing processing that the acquired target absorption torque or a difference between the acquired target absorption torque and a predetermined reference torque is stored as an adjustment value, and a processor means for limiting the target absorption torque, which has been computed by the torque limiter means, by the adjustment value.

In the present invention constructed as described above, when the start of an adjustment of the maximum absorption torque of the main pump is instructed by the start means, processing is performed to slowly decrement, with the load on the sub-pump other than the main pump, such as a cooling fan pump, being set at the maximum load, in other words, being set corresponding to the maximum absorption toque, the absorption torque of the main pump from a maximum side thereof until the load factor of the prime mover becomes the target value, i.e., the target load factor. By slowly decrementing as described above, the adjustment is feasible at a stationary point. When the load factor of the prime mover comes into conformity with the target load factor, an absorption torque is acquired for the main pump. The value so acquired serves as an adjustment value. The absorption torque control of the main pump is performed with the maximum absorption torque of the main pump being limited such that the maximum absorption torque remains not greater than the adjustment value. As a consequence, the load factor of the prime mover is limited such that it does not exceed the target load factor. Described specifically, when a sub-pump different in characteristics from a main pump is connected to a prime mover, the maximum absorption torque or the main pump can be precisely and easily adjusted in accordance with the environmental conditions and use conditions. Because the current maximum absorption torque of the main pump can be precisely adjusted with the absorption torque of the sub-pump being set corresponding to the maximum load, in other words, at the maximum absorption torque, it is possible to prevent an interference in pump absorption torque between the main pump and the sub-pump.

The present invention may also be characterized in that in each of the above-described inventions, the pump torque control system further comprises an input device capable of changing the target load factor.

The present invention may also be characterized in that in the above-described invention, the pump torque control system further comprises an output device capable of informing the adjustment value and a result of the adjustment.

The present invention may also be characterized in that in each of the above-described inventions, the sub-pump comprises a cooling fan pump.

Advantageous Effects of the Invention

The present invention is constructed such that with the absorption torque of the sub-pump being set at the maximum absorption torque, the target absorption torque for the adjustment of the main pump is incremented at a slow rate from the sufficiently small pump absorption torque or is decremented, to the extent that the prime mover does not stall, from the preset, sufficiently large pump absorption torque to obtain the adjustment value as a limitation value for the pump absorption torque and that the maximum absorption torque of the main pump is limited by the control value. When the sub-pump different in characteristics from the main pump is connected to the prime mover, the maximum absorption torque of the main pump can, therefore, be precisely and easily adjusted in accordance with the environmental conditions and use conditions. Accordingly, the operator of the hydraulic working machine can adjust the maximum absorption torque of the main pump.

Further, the current maximum absorption torque of the main pump can be precisely adjusted with the absorption torque of the sub-torque being set at the maximum absorption torque. It is, therefore, possible to prevent an interference in pump absorption torque between the main pump and the sub-pump, thereby making it possible to assure excellent operability and working performance of the hydraulic working machine irrespective of differences in environmental conditions and use conditions.

BEST MODES FOR CARRYING OUT THE INVENTION

Based on drawings, a description will hereinafter be made of best modes for carrying out the pump torque control system according to the present invention for the hydraulic working machine.

[Basic Construction of a Hydraulic Excavator to be Equipped with this Embodiment]

FIG. 1 is a hydraulic circuit diagram illustrating one embodiment of the pump torque control system according to the present invention for the hydraulic working machine.

As illustrated in FIG. 1, the pump torque control system according to this embodiment is arranged on a hydraulic working machine, for example, a hydraulic excavator. The hydraulic excavator is provided with a prime motor, i.e., an engine 3, a revolution speed setting means for setting a revolution speed of the engine 3, for example, an engine control dial 1, and a revolution pickup sensor 4 for detecting an actual revolution speed of the engine 3. Also provided is a prime mover controller, i.e., an engine controller 2, which has an input means for loading a preset revolution speed signal Nr set by the engine control dial 1, a control means for controlling the revolution speed of the engine 3 based on the preset revolution speed signal Nr set by the engine control dial 1, an output means for outputting to an outside a signal corresponding to the actual revolution speed of the engine 3 detected by the revolution pickup sensor 4, and an output means for outputting to the outside a load factor signal corresponding to an engine output torque.

This hydraulic excavator is equipped with a cylinder actuator 16 for driving a movable element such as a boom or arm, a motor actuator 17 for driving a movable structure such as a swing upper structure or travel base, a main hydraulic pump for feeding pressure oil to these actuators 16,17, i.e., a main pump 13, and sub-pumps different in characteristics from the main pump 13, for example, a pilot pump 6 and cooling fan pump 20. These main pump 13, pilot pump 6 and cooling fan pomp 20 are driven by the engine 3.

Also equipped are directional control valves 9,9*a* for controlling flow rates and directions of pressure oil to be fed from the main pump 13 to the actuators 16,17, remote control valves 5, 5*a* for switching these directional control valves 9,9*a*, a gate lock valve 8, and a main pump regulator for controlling a displacement volume of the main pump 13, i.e., a main pump regulator 14.

Further equipped are a radiator for being fed with pressure oil from the above-described cooling fan pump 20 and for circulating engine coolant therethrough, i.e., a radiator 18*a*, a radiator for circulating hydraulic oil therethrough, i.e., a hydraulic oil cooler 18, a cooling fan 22*a* for blowing air against these radiator 18*a* and hydraulic oil cooler 18, a cooling fan motor 22 for being fed with pressure oil from the above-mentioned cooling fan pump 20 to drive the cooling fan 22*a*, and a sub-pump regulator for controlling a displacement volume of the cooling fan pump 20, i.e., a cooling fan pump regulator 21. In FIG. 1, numeral 19 designates a hydraulic oil reservoir.

[Basic Construction of the Pump Torque Control System According to this Embodiment]

As illustrated in FIG. 1, the pump torque control system according to this embodiment, which is arranged on such a hydraulic excavator as described above, is provided with a solenoid-operated proportional valve for the main pump, said valve being adapted to drive the main pump regulator 14, i.e., a solenoid-operated proportional valve 23 for the main pump, and a solenoid-operated proportional valve for the sub-pump, said valve being adapted to drive the cooling fan pump regulator 21, i.e., a solenoid-operated proportional valve 24 for the sub-pump.

Also provided are a stroke detector for detecting strokes of remote control valves 5,5*a* which switch the directional control valves 9,9*a* via a shuttle valve 10, for example, a lever-regulated, pump control pressure sensor 11, and a delivery pressure detector for detecting a delivery pressure of the main pump 13, i.e., a main pump delivery pressure sensor 15. Although not show in the figure, there are also provided a coolant temperature detector for detecting the coolant of the engine 3, i.e., a coolant temperature sensor, and a hydraulic oil pressure detector for detecting the temperature of hydraulic oil, i.e., a hydraulic oil temperature sensor.

Further arranged is a main controller 12, to which the engine control dial 1 and engine controller 2 are connected and to which the above-mentioned lever-regulated, pump control pressure sensor 11 and main pump delivery pressure sensor 15 and the unillustrated coolant temperature sensor and hydraulic oil temperature sensor are also connected.

The main controller 12 basically include, for example, a. A positive control means for computing a target displacement volume based on a stroke signal outputted from the lever-regulated, pump control pressure sensor 11 b. A torque limiter means for computing a target absorption torque for the main pump 13 from a preset revolution speed signal outputted from the engine control dial 1 and for computing a target displacement volume for the main pump 13 from the computed target absorption torque and a delivery pressure signal outputted from the main pump delivery pressure sensor 15 c. An input means for loading the preset revolution speed signal Nr set by the engine control dial 1 d. An input means for loading a stroke signal outputted from the lever-regulated, pump control pressure sensor 11 e. An input means for loading the delivery pressure signal outputted from the main pump delivery pressure sensor 15 f. An input means for loading a coolant temperature signal outputted from the unillustrated coolant temperature sensor g. An input means for loading a hydraulic oil temperature signal outputted from the unillustrated hydraulic oil temperature sensor h. A selector means for comparing the target displacement volume computed by the above-mentioned lever-regulated, pump control pressure sensor 11 with the target displacement volume computed by the torque limiter means and for selecting the smaller one as a target displacement volume i. An output means for outputting a control signal to the solenoid-operated proportional valve 23 for the main pump based on the target displacement volume for the main pump 13 selected by the selector means mentioned above under "h.", i.e., an output means for outputting a control current j. A computer means for computing a target displacement volume for the cooling fan pump 20 based on the unillustrated coolant temperature sensor and hydraulic oil temperature sensor k. An output means for outputting a control signal to the solenoid-operated proportional valve 24 for the cooling fan pump based on the target displacement volume for the cooling fan pump 20 computed by the computer means mentioned above under "j.", i.e., an output means for outputting a control current.

[Characteristic Construction of this Embodiment]

In particular, this embodiment is provided with a start means for instructing a start of an adjustment of the maximum absorption torque of the main pump 13, i.e., an adjustment switch 25 operable by an operator of the hydraulic excavator, an input device 26 capable of changing the target load factor for the engine 3, and an output device 27 for informing the operator of an adjustment value and an adjustment result to be described subsequently herein. These adjustment switch 25, input device 26 and output device 27 are elements of structure, which are included in a monitor unit arranged inside an operator's cab. These adjustment switch 25, input device 26 and output device 27 are connected to the main controller 12.

Specifically in this embodiment, the main controller 12 includes the elements to be listed below:

A. A first determination means for determining if the setting of the preset revolution speed signal Nr, which was set by the engine control dial 1, has been fixed at a rated revolution speed by the instruction from the above-mentioned start switch 25 and for outputting a result of the determination B. A second determination means for determining, by the instruction from the start switch 25, if the delivery pressure detected by the main pump delivery pressure sensor 15 is higher than a predetermined value set beforehand and for outputting a result of the determination, C. A third determination means for determining, by the instruction from the start switch 25, if the stroke detected by lever-regulated, pump control pressure sensor 11 is greater than a predetermined value set beforehand and for outputting a result of the determination, D. A processor means for switching, when all the determinations by the first, second and third means have resulted in "YES", the target displacement volume for the cooling fan pump 20 such that a level of an absorption torque of the cooling fan pump 20 is set to correspond to a maximum load in use, in other words, is set at a maximum absorption torque E. An input means for loading the load factor signal associated with the engine 3 and outputted from the engine controller 2

F. A processor means for incrementing a target absorption torque for the adjustment at a slow rate from a sufficiently small pump absorption torque G. A fourth determination means for determining if a difference between a load factor of the engine 3 and the target load factor falls within a predetermined range and for outputting a result of the determination H. A processor means for repeatedly performing the loading of the load factor signal and the increment of the target absorption torque for the adjustment as long as the determination by the fourth determination means results in "NO" in the above-mentioned "G"

I. A processor means for acquiring, when the determination by the fourth determination means has resulted in "YES" in the above-mentioned "G", a target absorption torque at that time and for performing processing that the acquired value is stored as an adjustment value J. A processor means for limiting the target absorption torque, which has been computed by the torque limiter means, by the adjustment value.

[Outline of Operations of the Hydraulic Excavator]

A description will hereinafter be made about the outline of operations of the hydraulic excavator which includes the above-described construction of this embodiment.

When the operator sets a target engine revolution speed through the engine control dial 1, the preset revolution speed signal Nr of the engine control dial 1 is loaded into the engine controller 2. Similarly, the preset revolution speed signal Nr of the engine control dial 1 is also loaded into the main controller 12. The engine controller 2 controls the revolution speed and output of the engine 3. An actual engine revolution speed signal N detected by the revolution pickup sensor 4 is loaded into the engine controller 2, and is used to control the engine. The actual engine revolution speed N and an engine load factor signal EngLoad, both of which have been outputted from the engine controller 2, are loaded into the main controller 12.

When the operator manipulates the remote control valve 5 or 5*a*, oil delivered from the pilot pump 6 is guided to the directional control valve 9 or 9*a* via the filter 7, gate lock valve 8 and remote control valve 5 or 5*a*. The oil flowed via the shuttle valve 10 is detected by the lever-regulated, pump control pressure sensor 11, and is loaded as a lever-regulated, pump control pressure signal into the main controller 12.

The main controller 12 outputs a control current to the solenoid-operated proportional valve 23 for the main pump based on positive control by the positive control means and torque control by the torque control means.

The solenoid-operated proportional valve 23 for the main pump drives the main pump regulator 14 to control the tilting of the main pump 13. The oil delivered from the main pump 13 is detected by the main pump delivery pressure sensor 15, and is loaded, as a pump delivery pressure signal, into the main controller 12. Further, the oil delivered from the main pump 13 is controlled in flow rate and direction by the directional control valve 9 or 9*a*, and the oil returned from the cylinder actuator 16 and motor actuator 17 is returned to the hydraulic oil reservoir 19 via the directional control valves 9,9*a* and hydraulic oil cooler 18.

The coolant temperature signal detected by the unillustrated coolant temperature sensor and the hydraulic oil temperature signal detected by the hydraulic oil temperature sensor are loaded into the main controller 12. Corresponding to the coolant temperature signal and hydraulic oil temperature signal, the main controller 12 outputs a control signal to the solenoid-operated proportional valve 24 for the cooling fan pump.

The solenoid-operated proportional valve 24 for the cooling fan pump drives the regulator 21 for the cooling fan pump, and controls the tilting of the cooling fan pump 20. The oil delivered from the cooling fan pump 20 drives the cooling fan motor 22, and blows air to cool the hydraulic oil and coolant. The oil returned from the cooling fan motor 22 is returned to the hydraulic oil reservoir 19.

[Adjustment of the Maximum Absorption Torque of the Main Pump in this Embodiment]

A description will next be made about an adjustment of the maximum absorption torque of the main pump 13 in this embodiment.

The operator inputs the target load factor for the engine 3 into the main controller 12 through the input device 26. The operator also fixes the engine control dial 1 at a rated revolution speed. The operator further operates the remote control valve 5 corresponding to a boom raising operation to cause the cylinder actuator 16 corresponding to the boom to extend, so that the pump torque control system is brought into a boom raising relief state. As a result, the delivery pressure of the main pump 13 is held at a relief pressure Pd_max. When the adjustment switch 25 is turned on in this state, an adjustment of the maximum absorption torque of the main pump 13 is started.

When the below-described conditions that can determine a pump flow rate to be a flow rate determined by torque control are met, the main controller 12 sets the absorption torque of the cooling fan pump 20, which is the sub-pump, at a maximum absorption torque in use.

[Conditions]

A lever-regulated, pump control pressure Pi detected by the lever-regulated, pump control pressure sensor 11 is equal to or higher than a predetermined operation pressure value which can be determined by the third determination means when a pump flow rate is determined by torque control, in other words, a predetermined value.

A delivery pressure Pd of the main pump 13 detected by the main pump delivery pressure pump 15 is equal to or higher than a predetermined pressure value which is rather low and can be determined to have been substantially relieved by the second determination means, in other words, a predetermined value.

The engine control dial 1 has not been operated (Nr in the current control=Nr in the preceding control).

The preset revolution speed signal Nr outputted from the engine control dial 1 is determined to be the rated revolution speed by the first determination means.

When the absorption torque of the cooling fan pump 20 is set at the maximum absorption torque as mentioned above, the delivered oil has a maximum flow rate in use so that the cooling fan motor 22 revolves at a highest speed. The absorption torque of the main pump 13 is next set at a minimum absorption torque. The oil delivered from the main pump 13 has a flow rate corresponding to the minimum absorption torque.

The absorption toque of the main pump 13 is then slowly incremented until the output of the engine 3 becomes equal to the target load factor. The absorption torque at the time that the load factor of the engine 3 has become equal to the target load factor is acquired as an adjustment value. This is the maximum absorption torque which can be allocated to the main pump 13. As shown in the P-Q diagram of FIG. 3, the maximum absorption torque T2 which can be allocated to the main pump 13 is the torque obtained by subtracting an absorption torque t3 of the pilot pump 6 and an absorption torque t2 of the cooling fan pump 20 from a torque T1 corresponding to the target load factor of the rated engine revolution speed. It is to be noted that in FIG. 3, T3 designates the minimum absorption torque of the main pump 13 and t1 indicates the absorption torque allocated to the main pump 13.

[Outline of Processing at the Main Controller]

FIG. 2 is a diagram illustrating the outline of processing at the main controller arranged in this embodiment.

As shown in FIG. 2, when power is applied to the main controller 12, initialization processing is performed firstly. At this time, data such as the target load factor for the engine 3, the below-described adjustment value AdjVal, an adjustment result and an adjustment status indicating primarily a cause of an adjustment failure are read from a nonvolatile memory EEPROM. Further, initialization or the like of variables is also performed.

In input signal processing, various signals are loaded including an ON/OFF signal of the adjustment switch 25 connected to the main controller 12, a main pump delivery pressure Pd detected by the main pump delivery pressure sensor 15, a preset revolution speed signal Nr as a target revolution speed for the engine 3 outputted from the engine control dial 1, and an actual revolution speed signal N outputted from the engine controller 2. Next, processing 1 for determining the below-described adjustment value AdjVal and processing 2 relating to control of a maximum absorption torque of the main pump 13 based on the thus-determined adjustment value AdjVal are successively performed. In output signal processing, signals such as a control current FanVal for the solenoid-operated proportional valve 24 for the cooling fan pump, said valve being connected to the main controller 12, a control current MainVal for the solenoid-operated proportional valve 23 for the main pump, the adjustment value AdjVal, the adjustment result and the adjusted status are outputted. These input signal processing, processing 1, processing 2 and output signal processing are repeatedly performed.

[Processing 1 Performed at the Main Controller]

FIGS. 4 through 6 are flow charts, which describe the processing 1 for determining a control value at the main controller arranged in this embodiment. The flow chart of FIG. 5 illustrates processing which follows the processing shown in FIG. 4, and the flow chart of FIG. 6 depicts processing which follows the processing illustrated in FIG. 5. Based on FIGS. 4 through 6, a description will hereinafter be made about the processing 1 for determining the adjustment value AdjVal.

As illustrated in FIG. 4, step 0 is performed immediately after the application of power. In this step 0, normal control is set as a cooling fan control flag, and normal control is set as a torque control flag. The routine next advances to step 1.

In the step 1, the processing of step 1 is repeatedly performed until an OFF/ON edge from the adjustment switch 25 is detected. When the OFF/ON edge from the adjustment switch 25 is detected, the routine then advances to step 2.

In the step 2, an initial value TIME1 is set at a relief condition continuation wait timer timer1, and the routine then advances to step 3.

In the step 3, there are performed a determination if the adjustment switch 25 is OFF and a determination if the continuation of relief conditions is waited for. If the adjustment 25 is OFF, the adjustment is determined to have been cancelled and the routine returns to the step 0. If the relief conditions were met and have continued for a predetermine time, the routine then advances to step 4. The step 3 is repeatedly performed until the relief conditions are continued.

As illustrated in FIG. 5, in step 4, adjustment control is set as the cooling fan control flag. An initial value TIME 2 is set at a cooling fan maximum revolution speed wait timer timer2, and the routine then advances to step 5.

In the step 5, there are performed a determination if the adjustment switch is OFF, a determination if the relief conditions have been met, and a determination if the maximum revolution speed of the cooling fan 22*a* is waited for. If the adjustment switch 25 is OFF, the adjustment is determined to have been cancelled and the routine returns to the step 0. If the relief conditions are not met, a failure is set as an adjustment result. Further, as an adjustment result status, it is set to the effect that the relief conditions have not been met, and the routine then advances to step 9.

If the adjustment switch 25 is ON and the relief conditions have been met, on the other hand, it is waited until the cooling fan 22*a* reaches the maximum revolution speed, and the routine then advances to step 6.

In the step 6, an initial value TIME3 is set at an absorption torque increase/decrease interval timer timer3, an initial value TIME4 is set at an adjustment time-out detection timer timer4, a minimum absorption torque set as a target absorption torque Tr_temp for the adjustment, and adjustment control is set as the torque control flag, and the routine then advances to step 7.

As shown in FIG. 6, in the step 7, if the adjustment switch 25 is OFF, the adjustment is determined to have cancelled, and the routine then advances to the step 0.

If the relief conditions have not been met, a failure is set as an adjustment result, and as an adjustment result status, it is set to the effect that the relief conditions have not been met. The routine then advances to step 9.

If the adjustment is timed out, a failure is set as an adjustment result, and as an adjustment result status, it is set to the effect that the adjustment has been timed out. The routine then advances to the step 9.

If the load factor EngLoad of the engine 3 is determined by the fourth determination means to be smaller than the target load factor inputted by the input device 26, processing is performed to increment the target absorption torque Tr_temp for the adjustment by a constant quantity ΔTr-temp at constant time intervals.

If the load factor EngLoad of the engine 3 is determined to be greater than the target load factor by the fourth determination means, processing is performed to decrement the target absorption torque Tr_temp for the adjustment by the constant quantity ΔTr-temp at constant time intervals.

The increment/decrement of the target absorption torque Tr_temp for the adjustment is repeatedly performed until the load factor EngLoad of the engine 3 becomes equal to the target load factor. If the load factor EngLoad of the engine 3 became equal to the target load factor and has remained to be at the equal level for a predetermined time, a target absorption torque Tr_temp for adjustment is substituted for the adjustment value AdjVal. In other words, the adjustment value AdjVal is acquired. A success is now set as an adjustment result. As an adjustment result status, it is set to the effect that an adjustment is feasible. The routine then advances to step 8.

In the step 8, processing is performed to store the adjustment value AdjVal in the nonvolatile memory, and the routine then advances to step 9.

In the step 9, processing is performed to store the adjustment result and adjustment result status in the nonvolatile memory, and the routine then returns to the step 0. In this manner, the processing for the acquisition of the adjustment value AdjVal in the processing 1 is performed. It is to be noted that the adjustment value AdjVal, adjustment result and adjustment result status are each outputted from the main controller 12 to the output device 27 and then informed to the operator by the output device 27.

[Processing 2 Performed at the Main Controller]

FIGS. 7 and 8 are flow charts illustrating the processing 2 relating to the control of the maximum absorption torque of the main pump based on the adjustment at the main controller arranged in this embodiment. The flow chart of FIG. 8 shows processing which follows the processing shown in FIG. 7.

As illustrated in FIG. 7, a target displacement volume Dr_Pi for the main pump 13 is firstly determined from the lever-regulated, pump control pressure Pi detected by the lever-regulated, pump control pressure sensor 11. Namely, positive control is performed. If the torque control flag is normal control, the target absorption torque Tr for the main pump 13 is then determined from the preset revolution speed signal Nr. If the torque control flag is the above-mentioned adjustment control, processing is performed to substitute, for a target absorption torque Tr, the target absorption torque Tr_temp for the adjustment.

If the adjust result is successful, processing is performed to limit the target absorption torque Tr by the adjustment value AdjVal determined in the preceding processing 1.

Processing is performed to determine a target displacement volume Dr_Pd for the main pump 13 from the delivery pressure Pd of the main pump 13, which has been detected by the main pump delivery pressure sensor 15, on the basis of the P-Q(Pd-Dr_Pd) characteristic curve of the target absorption torque Tr, in other words, torque control by the torque limiter means is performed.

As illustrated in FIG. 8, processing is then performed to select the minimum displacement volume from the target displacement volume Dr_Pi for the positive control and the target displacement volume Dr_Pd for the torque control, so that a target displacement volume Dr_m for the main pump is determined.

Processing is then performed to determine the current MainVal of the solenoid-operated proportional valve for the main pump from the target displacement volume Dr_m for the main pump 13. The thus-determined current MainVal of the solenoid-operated proportional valve for the main pump is outputted as a control current to the solenoid-operated proportional valve 23 for the main pump as mentioned above, and by the control current, the main pump regulator 14 is driven to control the displacement volume of the main pump 13.

If the cooling fan control flag is the normal control, processing is performed to determine a target displacement volume Dr_f for the cooling fan pump 20 from the coolant temperature and hydraulic oil temperature.

If the cooling fan flag is not the normal control, processing is performed to change the target displacement volume Dr_f for the cooling fan pump 20 to a maximum displacement volume DR_F_MAX, in other words, processing is performed to change the absorption torque of the cooling fan pump 20 to the maximum absorption torque.

Here, slow processing is performed, for example, on the target displacement volume Dr_f for the cooling fan pump 20. This slow processing is processing which slowly brings the displacement volume of the cooling fan pump 20 into conformity with the target displacement volume Dr_f determined as mentioned above, and this slow processing is performed to reduce a variation in the load on the engine 3 due to an acceleration or deceleration of the cooling fan unit and also to protect the cooling fan unit from breakage by an abrupt drive of the cooling fan **22*a***.

From the target displacement volume Dr_f for the cooling fan pump 20 determined as mentioned above, the current FanVal is then determined for the solenoid-operated proportional valve for the cooling fan pump. The thus-determined current FanVAL of the solenoid-operated proportional valve for the cooling fan pump is outputted as a control current to the solenoid-operated proportional valve 24 for the cooling fan pump as mentioned above. By the control current, the cooling fan pump regulator 21 is driven to control the displacement volume of the cooling fan pump 20.

According to this embodiment constructed as described above, when a start is instructed by the adjustment switch 25 to adjust the maximum absorption torque of the main pump 13, processing is performed to slowly increment, with the load of the cooling fan pump 20 being set at the maximum load, that is, at a load corresponding to the maximum absorption torque, the absorption torque of the main pump 13 from the minimum side thereof until the load factor EngLoad of the engine 3 becomes the target load factor. By slowing incrementing as described above, the adjustment is feasible at a static point. When the load factor EngLoad of the engine 3 comes into conformity with the target load factor inputted by the input device 26, the maximum absorption torque of the main pump 13 is acquired, and this acquired value serves as the adjustment value AdjVal. With the maximum absorption torque of the main pump 13 being limited to the adjustment value AdjVal or smaller, the absorption torque control of the main pump 13 is performed. As a consequence, the load factor EngLoad of the engine 3 is limited such that it does not exceed the target load factor. When a sub-pump different in characteristics from the main pump 13, for example, the cooling fan pump 20 is connected together with the main pump 13 to the engine 3, the maximum absorption torque of the main pump 13 can be precisely and easily adjusted in accordance with the environmental conditions and use conditions. As a consequence, the adjustment of the maximum absorption torque of the main pump 13 by the operator of the hydraulic excavator is feasible.

As the current maximum absorption torque of the main pump 13 can be precisely adjusted with the cooling fan pump 20 being set at the maximum absorption torque, it is possible to avoid an interference in pump absorption torque between the main pump 13 and the cooling fan pump 20. As a consequence, it is possible to assure good operability and working performance for the hydraulic excavator irrespective of differences in the environmental conditions and use conditions.

In the above-described embodiment, the main controller 12 is constructed to be provided specifically with the processor means for incrementing the adjustment target absorption torque Tr_temp from the sufficiently small pump absorption torque by the constant quantity ΔTr_temp at constant time intervals, in other words, for incrementing it at a slow rate, the fourth determination means for determining if the difference between the load factor EngLoad of the engine 3 and the target load factor for the engine 3 falls within the predetermined range and for outputting the result of the determination, the processor means for repeatedly performing the loading of the load factor signal and the increment of the target absorption torque Tr_temp as long as the determination by the fourth determination means results in "NO", the processor means for acquiring, when the determination by the fourth determination means has resulted in "YES", the target absorption torque Tr_temp for the adjustment at that time and for performing processing to store the acquired target absorption torque as the adjustment value, and the processor means for limiting the target absorption torque, which has been computed by the torque limiter means, by the adjustment value AdjVal. It is, however, to be noted that the present invention is not limited to such a construction.

Described specifically, the main controller 12 may be constructed to be provided, instead of the above-described construction, with a processor means for decrementing, to an extent that the engine 3 does not stall, the target absorption torque Tr_temp for the adjustment at a slow rate from a sufficiently large pump absorption torque set beforehand, a fourth determination means for determining if the difference between the load factor of the engine 3 and the target load factor falls within the predetermined range and for outputting the result of the determination, a processor means for repeatedly performing the loading of the load factor signal and the decrement of the target absorption torque Tr_temp for the adjustment as long as the determination by the fourth determination means results in "NO", a processor means for acquiring, when the determination by the fourth determination means has resulted in "YES", the target absorption torque Tr_temp for the adjustment at that time and for performing processing to store the acquired target absorption torque as the adjustment value AdjVal, and a processor means for limiting the target absorption torque, which has been computed by the torque limiter means, by the adjustment value AdjVal.

The modification constructed as described above can bring about similar advantageous effects as the above-described embodiment.

In the above-described embodiment, the main controller 12 is provided with the processor means for acquiring, when the determination by the fourth determination means results in "YES", the target absorption torque for the adjustment at that time and for storing it as the adjustment value, in other words, when the load factor EngLoad of the engine became equal to the target load factor and the similar state has continued for the predetermined time, processing is performed to store the target absorption torque Tr_temp for the adjustment at that time as the adjustment value Adjval in the nonvolatile memory. The present invention is, however, not limited to such a construction. The main controller 12 may be provided with a processor means for storing, when the determination by the fourth determination means results in "YES", a difference between the target absorption torque Tr_temp at that time and a predetermined reference torque Tb, for example, the torque of a rated engine revolution as an adjustment value Adjval in a nonvolatile memory (Adjval=Tr_temp−Tb) and limiting a target absorption torque, which has been computed by the torque limiting means, by the adjustment value Adjval based on the above-mentioned difference.

LEGEND

Figure 1:
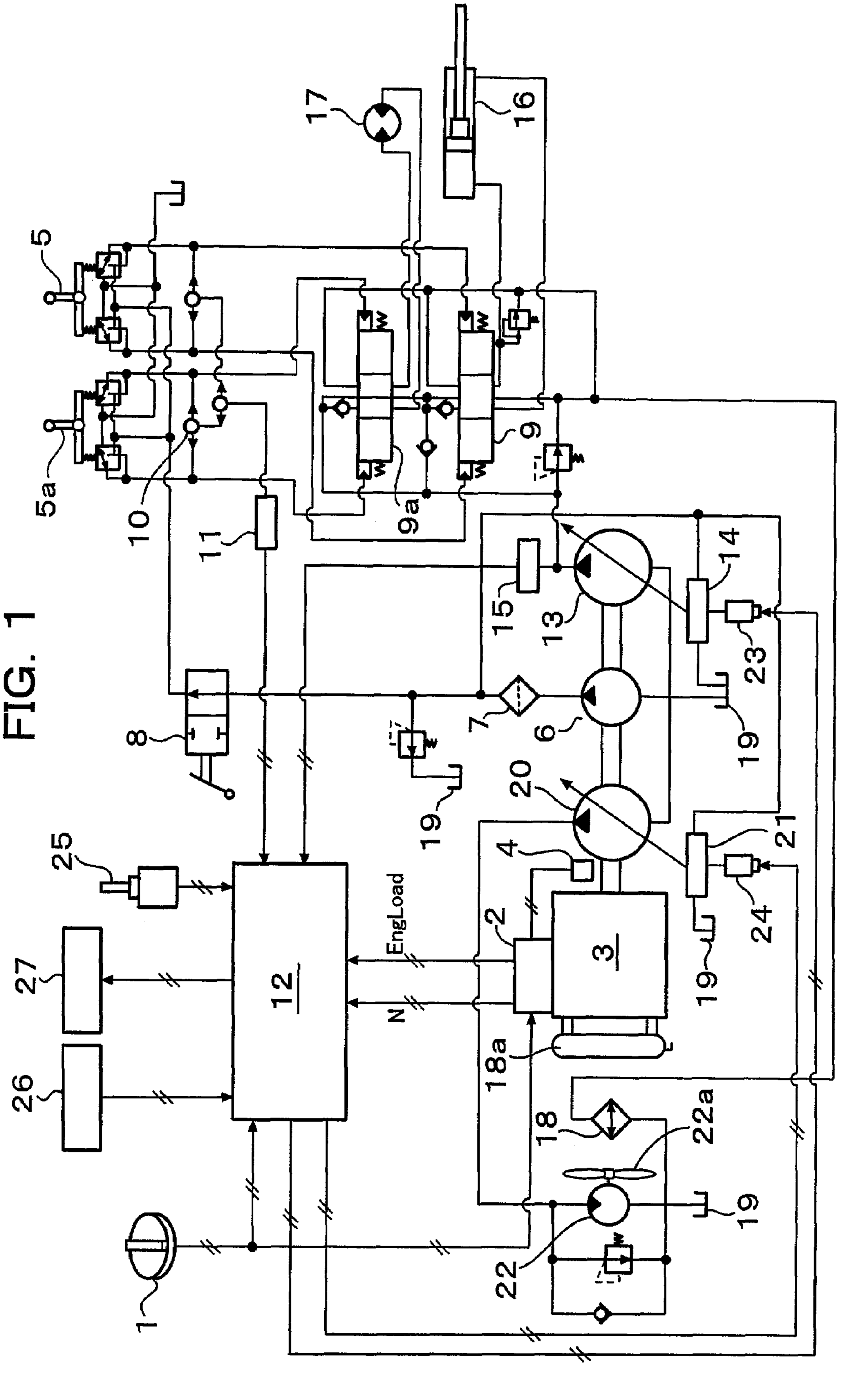
FIG. 1 A hydraulic circuit diagram showing one embodiment of the pump torque control system according to the present invention for a hydraulic working machine.
Figure 2:
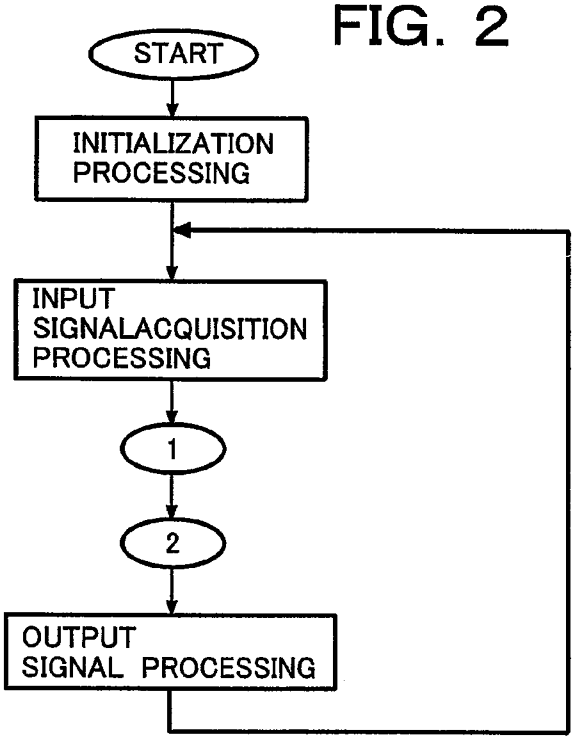
FIG. 2 A flow chart illustrating the outline of processing at a main controller arranged in the embodiment.
Figure 3:
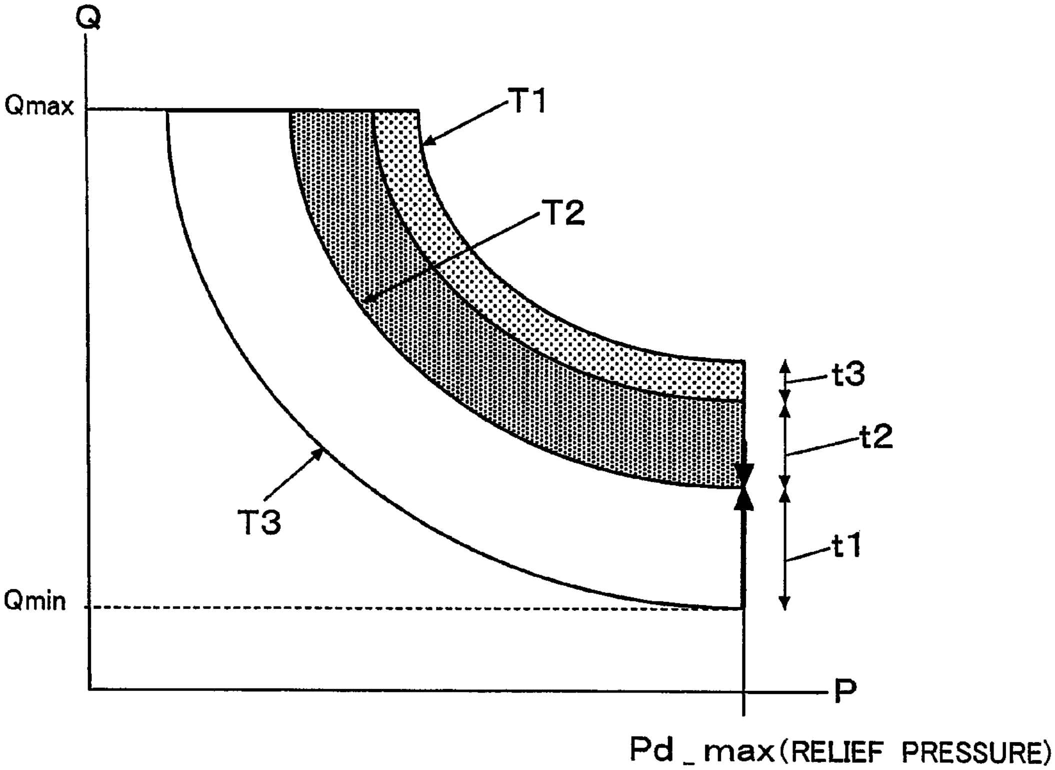
FIG. 3 A P-Q diagram illustrating allocations as an absorption torque of a main pump, an absorption torque of a pilot pump and an absorption torque of a cooling pump in the embodiment.
Figure 4:
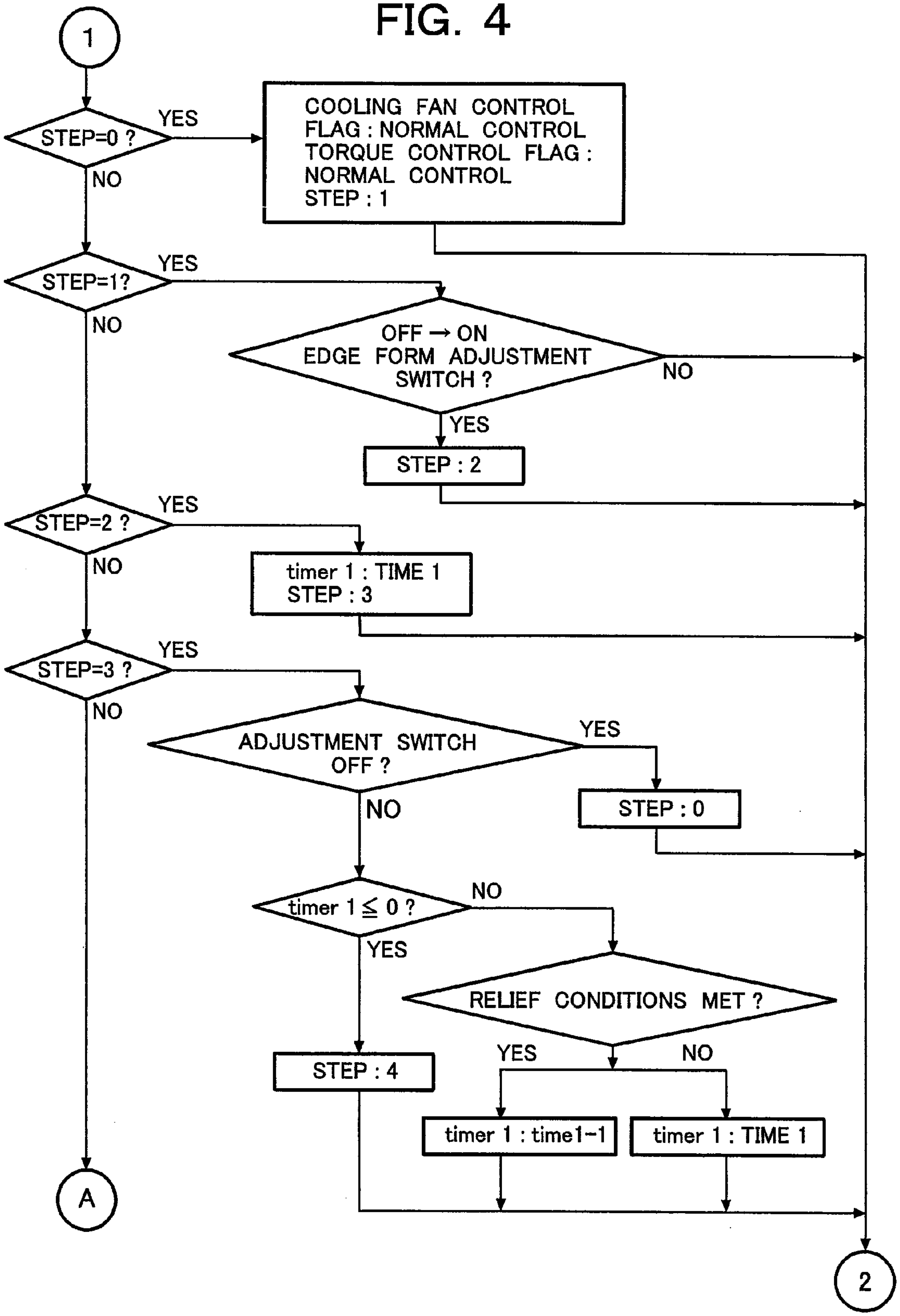
FIG. 4 A flow chart illustrating processing 1 for determining an adjustment value at the main controller arranged in the embodiment.
Figure 5:
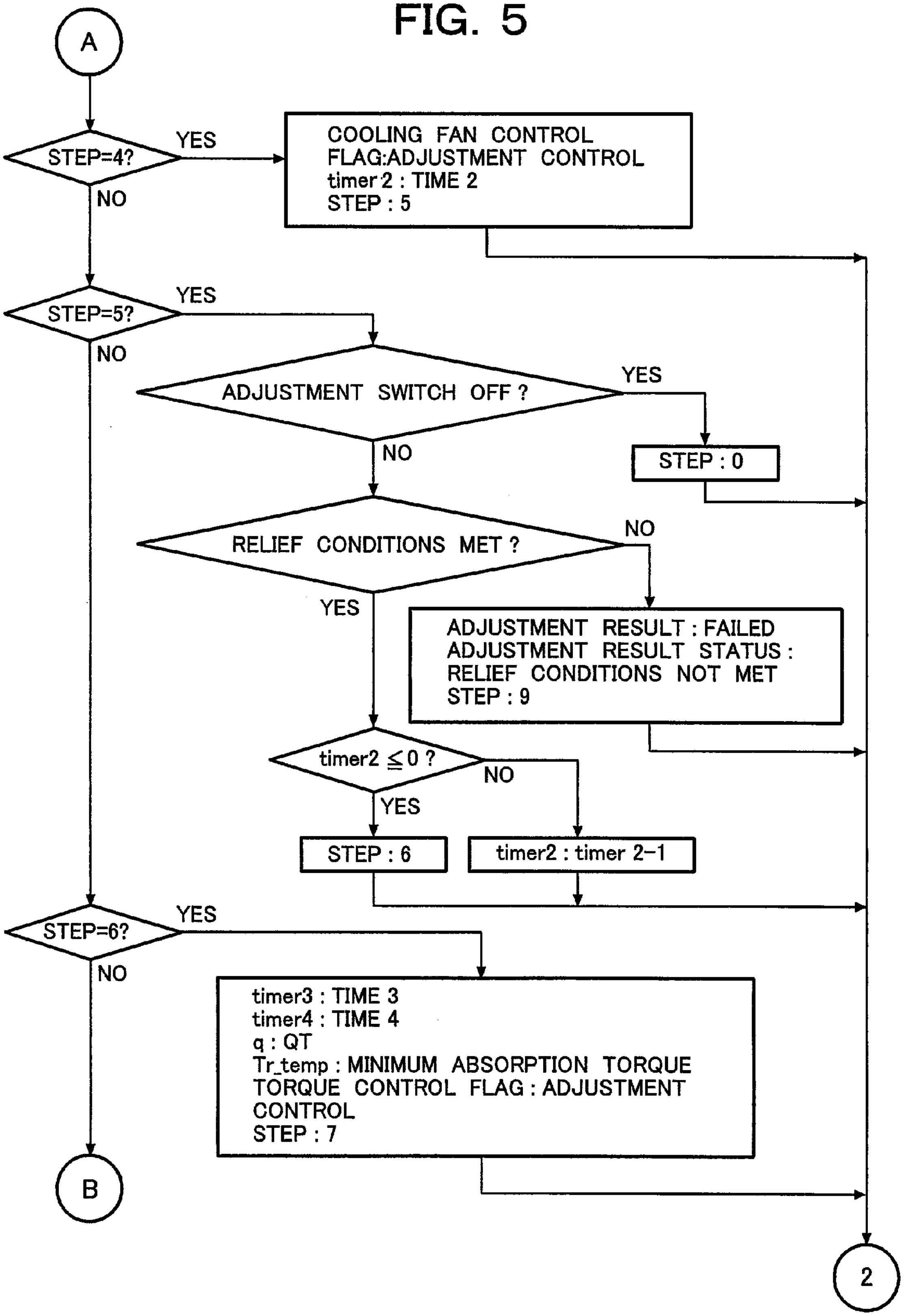
FIG. 5 A flow chart illustrating the processing 1 for determining the adjustment value at the main controller arranged in the embodiment, and showing a processing which follows the processing depicted in FIG. 4.
Figure 6:
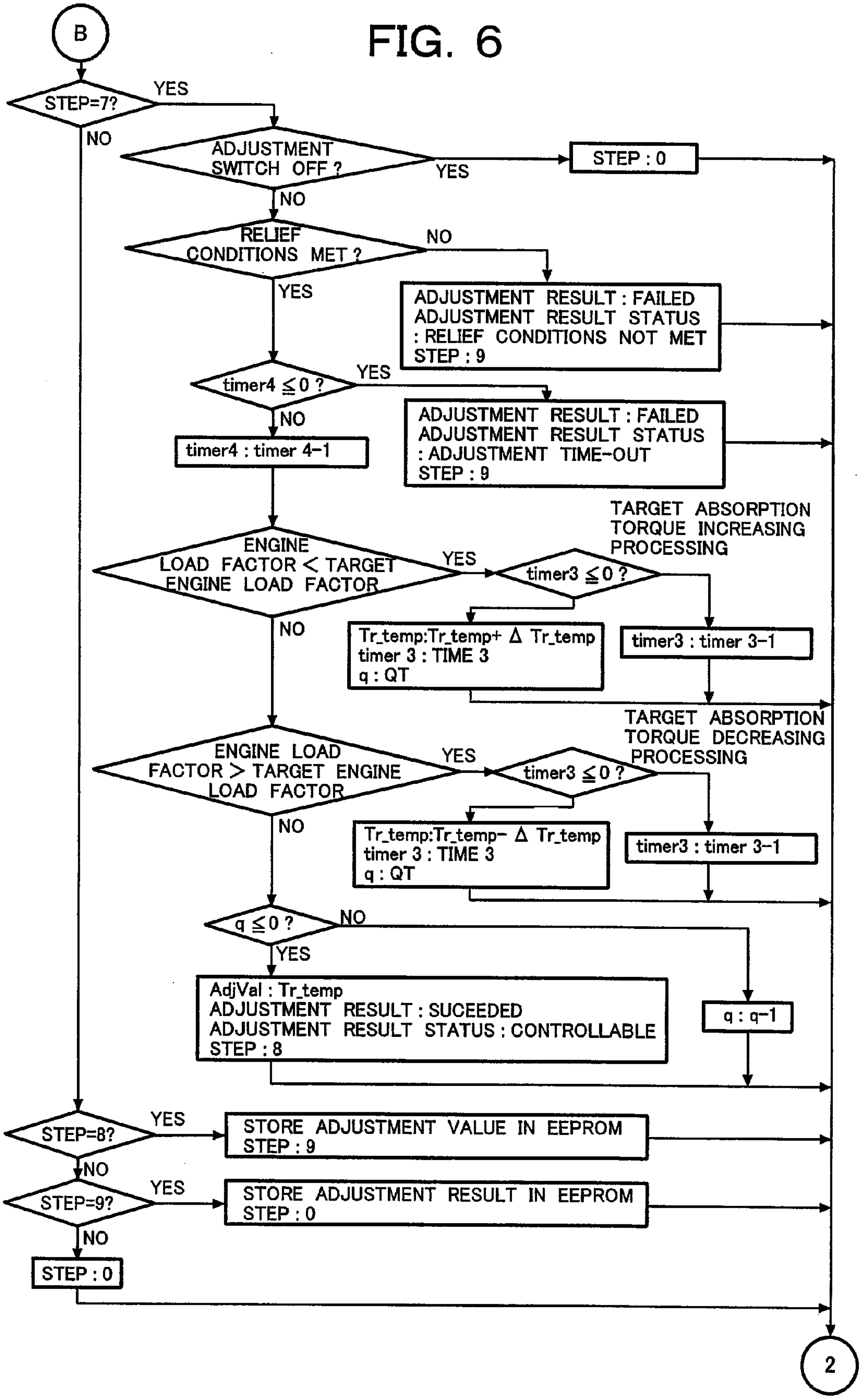
FIG. 6 A flow chart illustrating the processing 1 for determining the adjustment value at the main controller arranged in the embodiment, and showing a processing which follows the processing depicted in FIG. 5.
Figure 7:
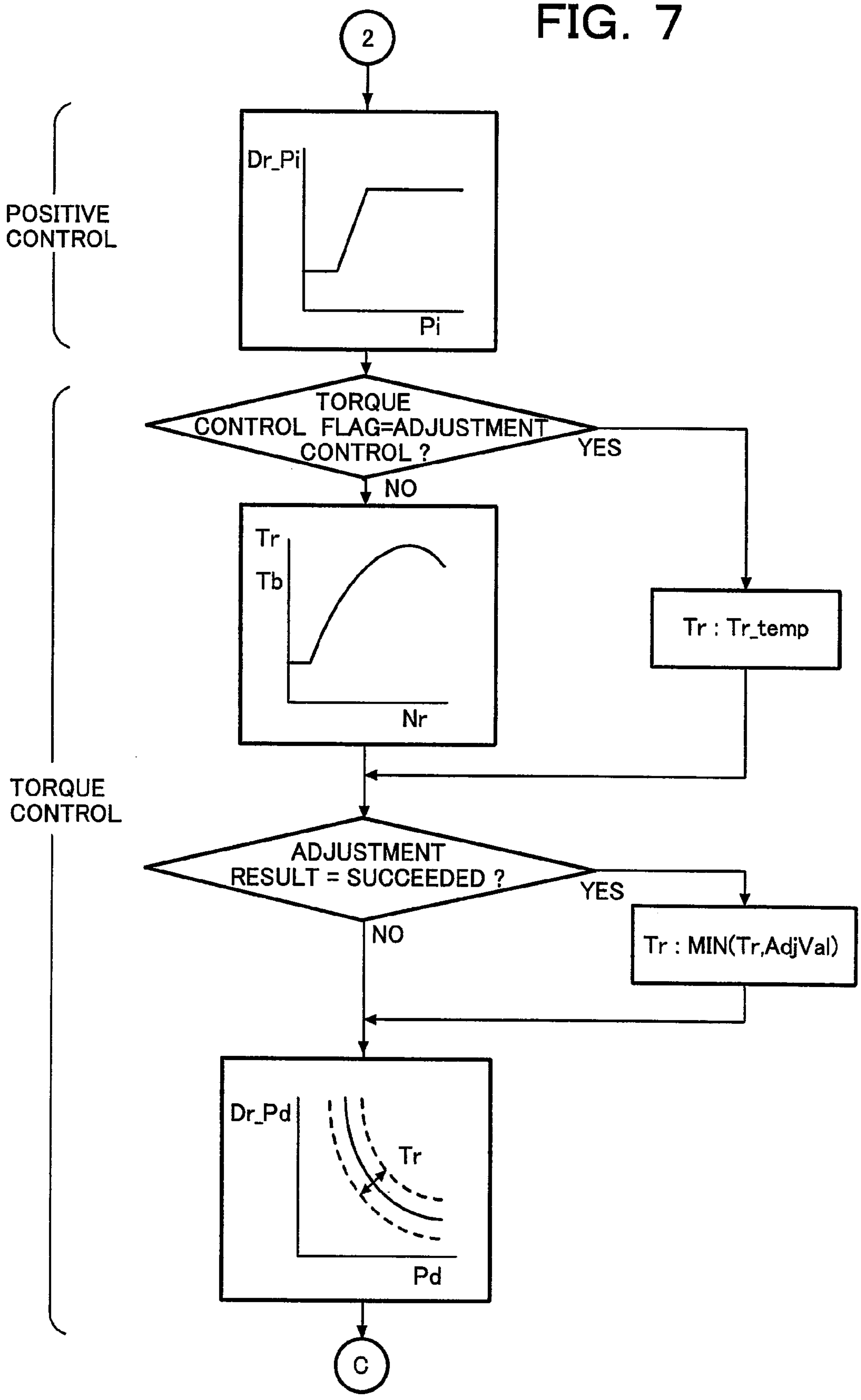
FIG. 7 A flow chart illustrating processing 2 relating to control of a maximum absorption torque of the main pump based on the adjustment value at the main controller arranged in the embodiment.
Figure 8:
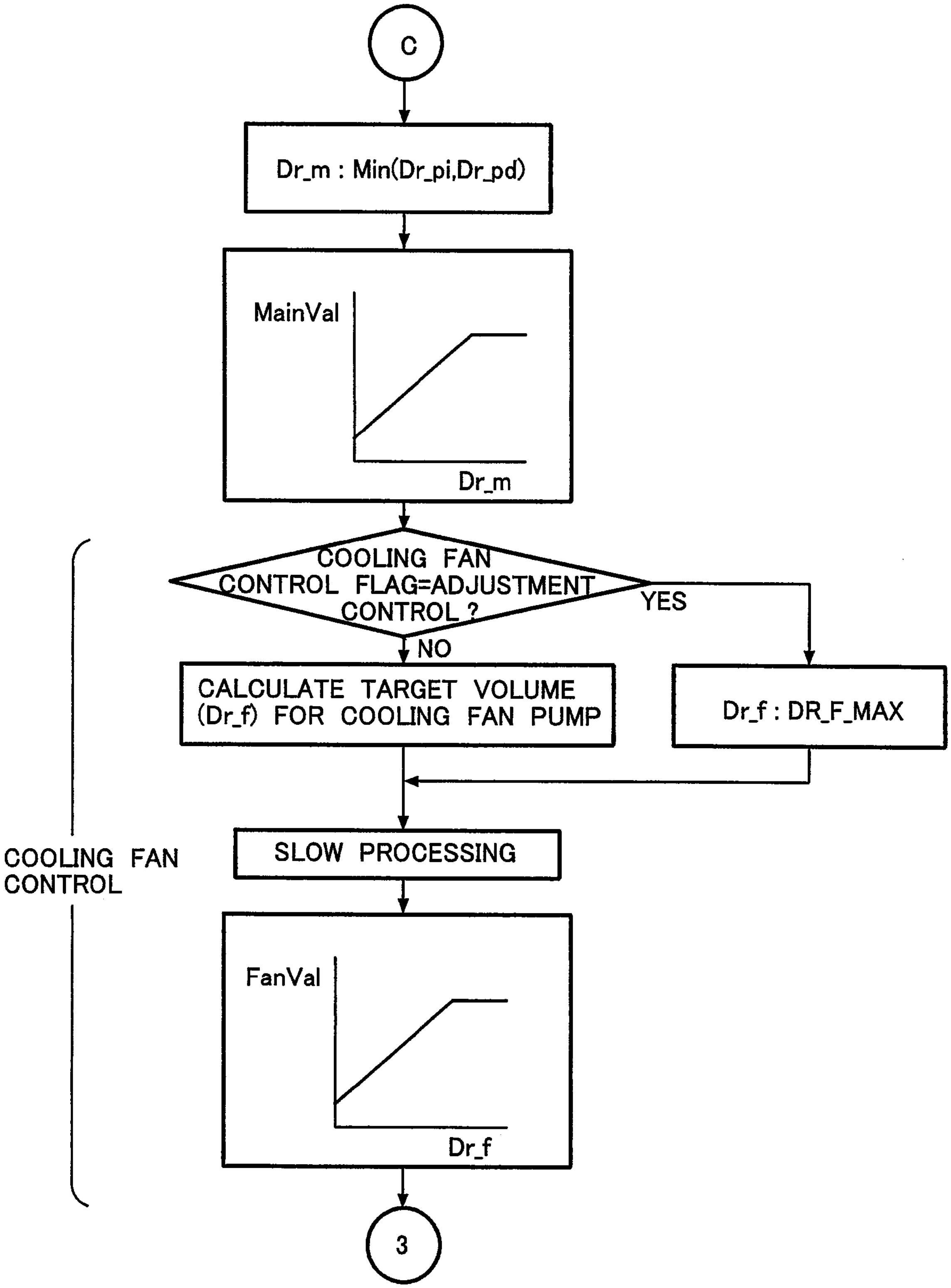
FIG. 8 A flow chart illustrating the processing 2 relating to the control of the maximum absorption torque of the main pump based on the adjustment value at the main controller arranged in the embodiment, and showing a processing which follows the processing depicted in FIG. 7.

1 Engine control dial (revolution speed setting means)
2 Engine controller (prime mover controller)
3 Engine (prime mover)
5 Remote control valve
5*a* Remote control valve
6 Pilot pump
9 Directional control valve
9*a* Directional control valve
11 Lever-regulated, pump control pressure sensor (stroke detector)
12 Main controller
13 Main pump (main pump)
14 Main pump regulator (regulator for the main pump)
15 Main pump delivery pressure sensor (delivery pressure detector)
16 Cylinder actuator
17 Motor actuator
20 Cooling fan motor (sub-pump)
21 Cooling fan pump regulator (regulator for the sub-pump)
22 Cooling fan motor
22*a* Cooling fan
23 Solenoid-operated proportional valve for the main pump (solenoid-operated proportional valve for the main pump)
24 Solenoid-operated proportional valve for the cooling fan pump (solenoid-operated proportional valve for the sub-pump)
25 Adjustment switch (start means)
26 Input device
27 Output device

The invention claimed is:

1. A pump torque control system for a hydraulic working machine having:

a prime mover, a revolution speed setting means for setting a revolution speed of said prime mover, a prime mover controller comprising an input means for loading the preset revolution speed signal set by said revolution speed setting means, a control means for controlling the revolution speed of said prime mover based on the preset revolution speed signal, an output means for outputting to an outside a signal corresponding an actual revolution speed of said prime mover, and an output means for outputting to said outside a load factor signal corresponding to an output torque of said prime mover, an actuator for driving a movable element, a variable displacement main pump drivable by said prime mover to feed pressure oil to said actuator, a directional control valve for controlling a flow rate and direction of pressure oil to be fed from said main pump to said actuator, a main pump regulator for controlling a displacement volume of said main pump, a variable displacement sub-pump drivable by said prime mover, and a sub-pump regulator for controlling a displacement volume of said sub-pump, wherein:

said pump torque control system is provided with:

a solenoid-operated proportional valve for said main pump to drive said main pump regulator, and a solenoid-operated proportional valve for said sub-pump to drive said sub-pump regulator, a stroke detector for detecting a stroke of said directional control valve, and a delivery pressure detector for detecting a delivery pressure of said main pump, a main controller comprising an input means for loading the preset revolution speed signal set by said revolution speed setting means, an input means for loading a stroke signal outputted from said stroke detector, an input means for loading a delivery pressure signal outputted from said delivery pressure detector, a positive control means for computing a target displacement volume based on the stroke signal outputted from said stroke detector, a torque limiter means for computing a target absorption torque for said main pump from the preset revolution speed signal outputted from said revolution speed setting means and for computing a target displacement volume for said main pump from the computed target absorption torque and the delivery pressure signal outputted from said delivery pressure detector, a selector means for comparing the target displacement volume computed by said positive control means with the target displacement volume computed by said torque limiter means and for selecting the smaller one as a target displacement volume, an output means for outputting a control signal to said solenoid-operated proportional valve for said main pump based on the target displacement volume selected by said selector means, a computer means for computing a target displacement volume for said sub-pump, and an output means for outputting a control signal to said solenoid-operated proportional valve for said sub-pump based on the target displacement volume for the sub-pump computed by said computer means, and a start means for instructing a start of an adjustment of a maximum absorption torque for said main pump; and said main controller comprises:

a first determination means for determining if the setting of the preset revolution speed, which was set by said revolution speed setting means, has been fixed at a rated revolution speed by the instruction from said start means and for outputting a result of the determination, a second determination means for determining, by the instruction from said start means, if the delivery pressure detected by said delivery pressure detector is higher than a predetermined value set beforehand and for outputting a result of the determination, a third determination means for determining, by the instruction from said start means, if the stroke detected by the stroke detector is greater than a predetermined value set beforehand and for outputting a result of the determination, a processor means for switching, when all the determinations by said first, second and third means have resulted in "YES", the target displacement volume for said sub-pump such that a level of an absorption torque of said sub-pump is set to correspond to a maximum load in use, an input means for loading the load factor signal associated with said prime mover and outputted from said prime mover controller, a processor means for incrementing a target absorption torque for the adjustment at a slow rate from a sufficiently small pump absorption torque, a fourth determination means for determining if a difference between a load factor of said prime mover and the target load factor falls within a predetermined range and for outputting a result of the determination, a processor means for repeatedly performing the loading of the load factor signal and the increment of the target absorption torque for the adjustment as long as the determination by the fourth determination means results in "NO", a processor means for acquiring, when the determination by said fourth determination means has resulted in "YES", a target absorption torque at that time and for performing processing that the acquired target absorption torque or a difference between the acquired target absorption torque and a predetermined reference torque is stored as an adjustment value, and a processor means for limiting the target absorption torque, which has been computed by said torque limiter means, by said adjustment value.

2. The invention according to claim 1, wherein said pump torque control system for said hydraulic working machine further comprises:

an input device capable of changing the target load factor.

3. The invention according to claim 2, wherein said pump torque control system for said hydraulic working machine further comprises:

an output device capable of informing the adjustment value and a result of the adjustment.

4. The invention according to claim 3, wherein in said pump torque control system for said hydraulic working machine, said sub-pump comprises a cooling fan pump.

5. The invention according to claim 2, wherein in said pump torque control system for said hydraulic working machine, said sub-pump comprises a cooling fan pump.

6. The invention according to claim 1, wherein in said pump torque control system for said hydraulic working machine, said sub-pump comprises a cooling fan pump.

7. A pump torque control system for a hydraulic working machine having:

a prime mover, a revolution speed setting means for setting a revolution speed of said prime mover, a prime mover controller comprising an input means for loading the preset revolution speed signal set by said revolution speed setting means, a control means for controlling the revolution speed of said prime mover based on the preset revolution speed signal, an output means for outputting to an outside a signal corresponding an actual revolution speed of said prime mover, and an output means for outputting to said outside a load factor signal corresponding to an output torque of said prime mover, an actuator for driving a movable element, a variable displacement main pump drivable by said prime mover to feed pressure oil to said actuator, a directional control valve for controlling a flow rate and direction of pressure oil to be fed from said main pump to said actuator, a main pump regulator for controlling a displacement volume of said main pump, a variable displacement sub-pump drivable by said prime mover, and a sub-pump regulator for controlling a displacement volume of said sub-pump, wherein:

said pump torque control system is provided with:

a solenoid-operated proportional valve for said main pump to drive said main pump regulator, and a solenoid-operated proportional valve for said sub-pump to drive said sub-pump regulator, a stroke detector for detecting a stroke of said directional control valve, and a delivery pressure detector for detecting a delivery pressure of said main pump, a main controller comprising an input means for loading the preset revolution speed signal set by said revolution speed setting means, an input means for loading a stroke signal outputted from said stroke detector, an input means for loading a delivery pressure signal outputted from said delivery pressure detector, a positive control means for computing a target displacement volume based on the stroke signal outputted from said stroke detector, a torque limiter means for computing a target absorption torque for said main pump from the preset revolution speed signal outputted from said revolution speed setting means and for computing a target displacement volume for said main pump from the computed target absorption torque and the delivery pressure signal outputted from said delivery pressure detector, a selector means for comparing the target displacement volume computed by said positive control means with the target displacement volume computed by said torque limiter means and for selecting the smaller one as a target displacement volume, an output means for outputting a control signal to said solenoid-operated proportional valve for said main pump based on the target displacement volume selected by said selector means, a computer means for computing a target displacement volume for said sub-pump, and an output means for outputting a control signal to said solenoid-operated proportional valve for said sub-pump based on the target displacement volume for the sub-pump computed by said computer means, and a start means for instructing a start of an adjustment of a maximum absorption torque for said main pump; and said main controller comprises:

a first determination means for determining if the setting of the preset revolution speed, which was set by said revolution speed setting means, has been fixed at a rated revolution speed by the instruction from said start means and for outputting a result of the determination, a second determination means for determining, by the instruction from said start means, if the delivery pressure detected by said delivery pressure detector is higher than a predetermined value set beforehand and for outputting a result of the determination, a third determination means for determining, by the instruction from said start means, if the stroke detected by the stroke detector is greater than a predetermined value set beforehand and for outputting a result of the determination, a processor means for switching, when all the determinations by said first, second and third means have resulted in "YES", the target displacement volume for said sub-pump such that a level of an absorption torque of said sub-pump is set to correspond to a maximum load in use, an input means for loading the load factor signal associated with said prime mover and outputted from said prime mover controller, a processor means for decrementing, to an extent that said prime mover does not stall, a target absorption torque for the adjustment at a slow rate from a sufficiently large pump absorption torque set beforehand, a fourth determination means for determining if a difference between a load factor of said prime mover and the target load factor falls within a predetermined range and for outputting a result of the determination, a processor means for repeatedly performing the loading of the load factor signal and the decrement of the target absorption torque for the adjustment as long as the determination by the fourth determination means results in "NO", a processor means for acquiring, when the determination by said fourth determination means has resulted in "YES", a target absorption torque at that time and for performing processing that the acquired target absorption torque or a difference between the acquired target absorption torque and a predetermined reference torque is stored as an adjustment value, and a processor means for limiting the target absorption torque, which has been computed by said torque limiter means, by said adjustment value.

8. The invention according to claim 7, wherein said pump torque control system for said hydraulic working machine further comprises:

an input device capable of changing the target load factor.

9. The invention according to claim 7, wherein in said pump torque control system for said hydraulic working machine, said sub-pump comprises a cooling fan pump.

* * * * *